United States Patent
Kanehira

Patent Number: 5,122,098
Date of Patent: Jun. 16, 1992

[54] TENSIONER

[75] Inventor: Makoto Kanehira, Hirakata, Japan

[73] Assignee: Tsubakimoto Chain Co., Osaka, Japan

[21] Appl. No.: 647,348

[22] Filed: Jan. 29, 1991

[30] Foreign Application Priority Data

Feb. 8, 1990 [JP] Japan ................................. 2-29851

[51] Int. Cl.$^5$ ............................................... F16H 7/08
[52] U.S. Cl. ................................... 474/111; 474/133; 474/159
[58] Field of Search ........ 474/111, 133, 135, 106–108, 474/140, 158, 159, 160, 162, 169–171, 174, 175, 177, 178

[56] References Cited

U.S. PATENT DOCUMENTS

| | | | |
|---|---|---|---|
| 4,337,055 | 6/1982 | Mackay et al. | 474/111 |
| 4,571,220 | 2/1986 | Nakano et al. | 474/111 |
| 4,642,073 | 2/1987 | Restelli | 474/111 |

Primary Examiner—Ramon S. Britts
Assistant Examiner—Roger J. Schoeppel
Attorney, Agent, or Firm—Stevens, Davis, Miller & Mosher

[57] ABSTRACT

A tensioner is used for reducing the slack of an endless belt wound between a driving rotating body mounted on a drive shaft and a driven rotating body mounted on a driven shaft. A tensioner comprises a base part having a sliding member fitted to the drive shaft or driven shaft with a frictional force, an arm part extending from the base part to a relaxed traveling line which is the return side line from the driving rotating body to the driven rotating body, and a contact member affixed to the arm part and abutting against the relaxed traveling line of the endless belt.

2 Claims, 7 Drawing Sheets

TENSIONER

The present invention relates to a tensioner capable of reducing the slack of an endless belt, in a power transmission system using an endless belt, without using slack adjusting means, which can be installed easily.

In a transmission using an endless belt of chain, belt or rope, elongation occurs as the endless belt wears or creeps due to prolonged use.

As an endless belt is elongated, idling or disengagement occurs in relation to the bodies rotated thereby, and transmission of motion is disturbed.

Figure 7:
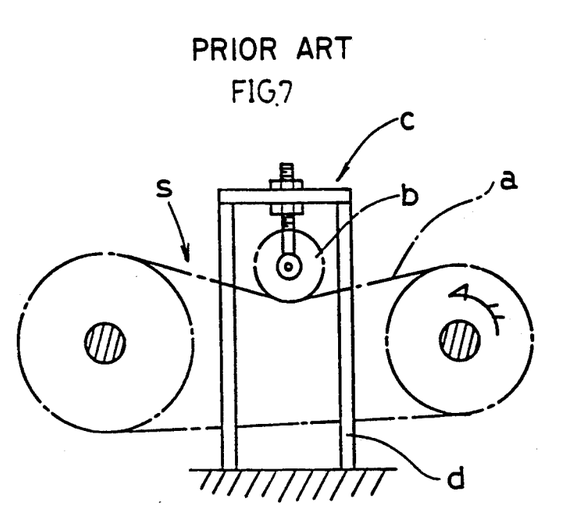
FIGS. 7, 8 are front views showing the prior art.

To eliminated the slack due to such elongation of the endless belt, conventionally, a slack removing tool c having a pressing roller b for pressing the endless belt a was often used at the slack side s of the endless belt a as show in FIG. 7.

In such slack removing tool c, in order to support the pressing roller b, a support stand d to support it was necessary, and the structure of the device was complicated. Or, depending on the size of the slack formed at the slack side s of the endless belt a, adjustment was always required, which was not convenient in actual handling.

Figure 8:
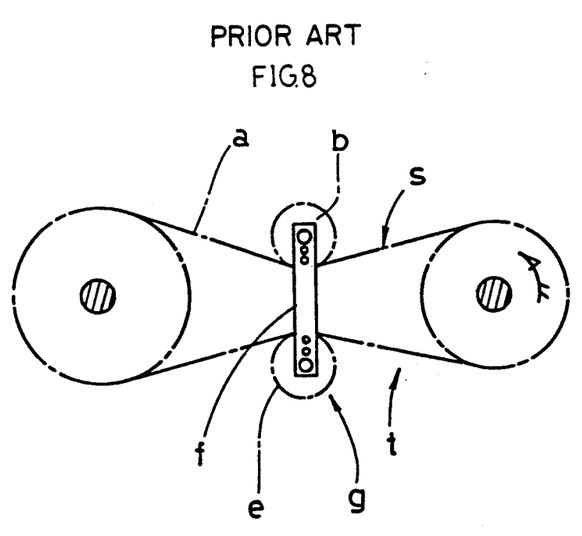

To solve a part of such problems, a "tension device for flexible driving element" was proposed in Japanese Laid-open Patent No. 62-21519, in which, as shown in FIG. 8, pressing rolleres b, e are disposed at both slack side S and tension side t of the endless belt a, and these two pressing rollers b, e are linked by a linkage rod f.

In the structure shown in FIG. 8, although the support stand to support the pressing rollers b, c may be omitted, since the tension side t of the endless belt a is pressed at the same time, the endless belt a is folded and bent also at the tension side t. Therefore, a large force acts on the pressing roller e of the tension side t, and the entire tension device must be fabricated rigidly, and the device weight is increased, while vibration is likely to occur at the endless belt a and the tension device g when starting up, and the operation is not smooth.

In addition, recently, a power transmission device using an endless belt between two shafts flexible extendable in the length between the drive shaft and driven shaft has come to be employed widely.

Figure 5:
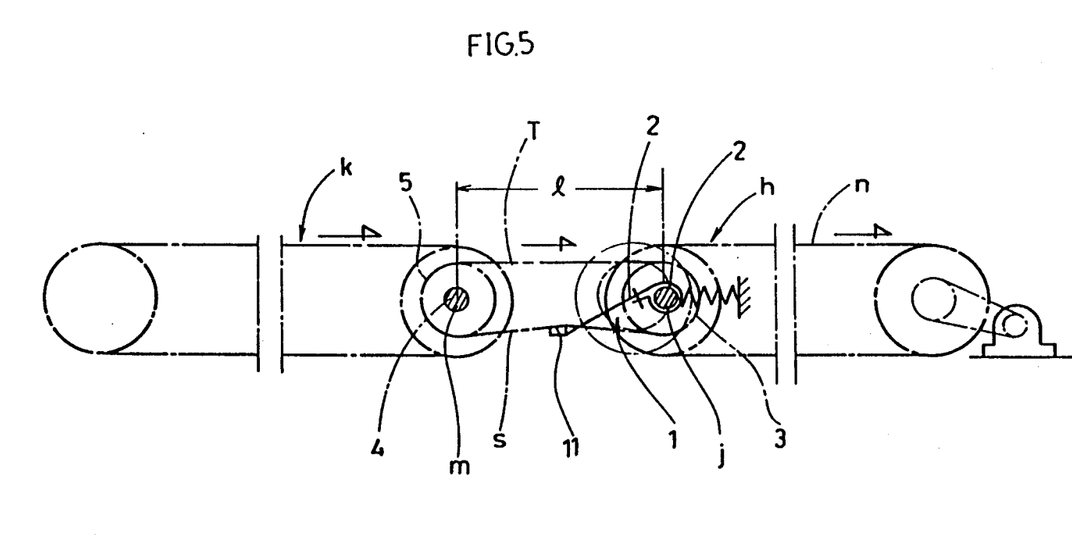
FIG. 5 is a front view showing an example of use.

For example, as shown in FIG. 5, using the tail shaft j of a first conveyor h as the drive shaft, in order to operate the main shaft m of a second conveyor k following it, a wound transmission mechanism is installed between the tail shaft j and the main shaft m, and the second conveyor k is operated by using power from the first conveyor h. In such a transmission mechanism, as the conveying element n of the first conveyor h is elongated or contracted by elasticity, the tail shaft j repeats to move toward and away from the main shaft m. In particular, while the conveying element n of the first conveyor h is passing through a heating furnace, the difference of the thermal expansion of the conveying element n is great between the operation mode and the stopping mode of the heating furnace, and the moving stroke of the tail shaft j is also large.

Figure 6:
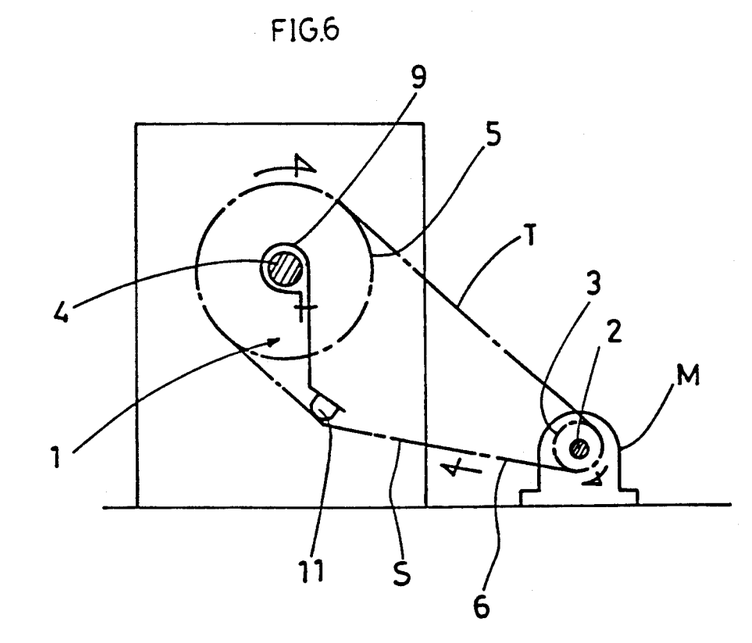
FIG. 6 is a front view showing a different embodiment.

In such condition, in the composition shown in FIG. 6, FIG. 7, the slack must be always adjusted depending on the operating state of the conveyor, which is practically next to impossible.

Therefore, even if the slack increases gradually due to wear or creep deformation of the endless belt, or further, as shown in FIG. 5, if the distance between the drive shaft and driven shaft always fluctuates, it is desired that the tensioner can reduce the slack of the endless belt without requiring adjustment work, and may be installed easily.

It is hence a primary object of the invention to present a tensioner which can decrease the slack of the endless belt without providing with adjusting means, by stretching the arm part on which can the contact surface member abutting against the endless belt is mounted, from the base part having a sliding member which is mounted with a frictional force on the drive shaft or driven shaft, and may be also installed easily.

According to one aspect of the present invention, a tensioner for reducing the slack of a relaxed traveling line of an endless belt for forming a power traveling line to transmit power as being applied on a driving rotating body mounted on a drive shaft and a driven rotating body mounted on a driven shaft and a return side relaxative traveling line between the rotating bodies, comprising a base part having a sliding member fitted to the drive shaft or driven shaft with a frictional force, an arm part extending along the relaxed traveling line of the endless belt from the base part, and a contact member affixed to the arm part and abutting against the relaxed traveling line of the endless belt.

The endless belt may include any endless chain, belt, line or the like that can form a wound transmission line.

The arm part is extending from the base part having a sliding member which is mounted on the drive shaft with a frictional force, so that the arm part may follow the rotation of the drive shaft and also turn in the direction of rotation of the drive shaft. As the contact surface member attached to the arm part abuts against the endless belt, the arm part is arrested of its turning, and the contact surface member can press the endless belt with a corresponding force by the frictional force generated between the base part and the drive shaft.

Besides, since the arm part is extending along the relaxative traveling line, it presses the relaxative traveling line side of the endless belt, so that the slack caused by traveling of the endless belt can be reduced.

Embodiments of the present invention will now be described by way of example only, referring to the attached drawings in which.

Figure 1:
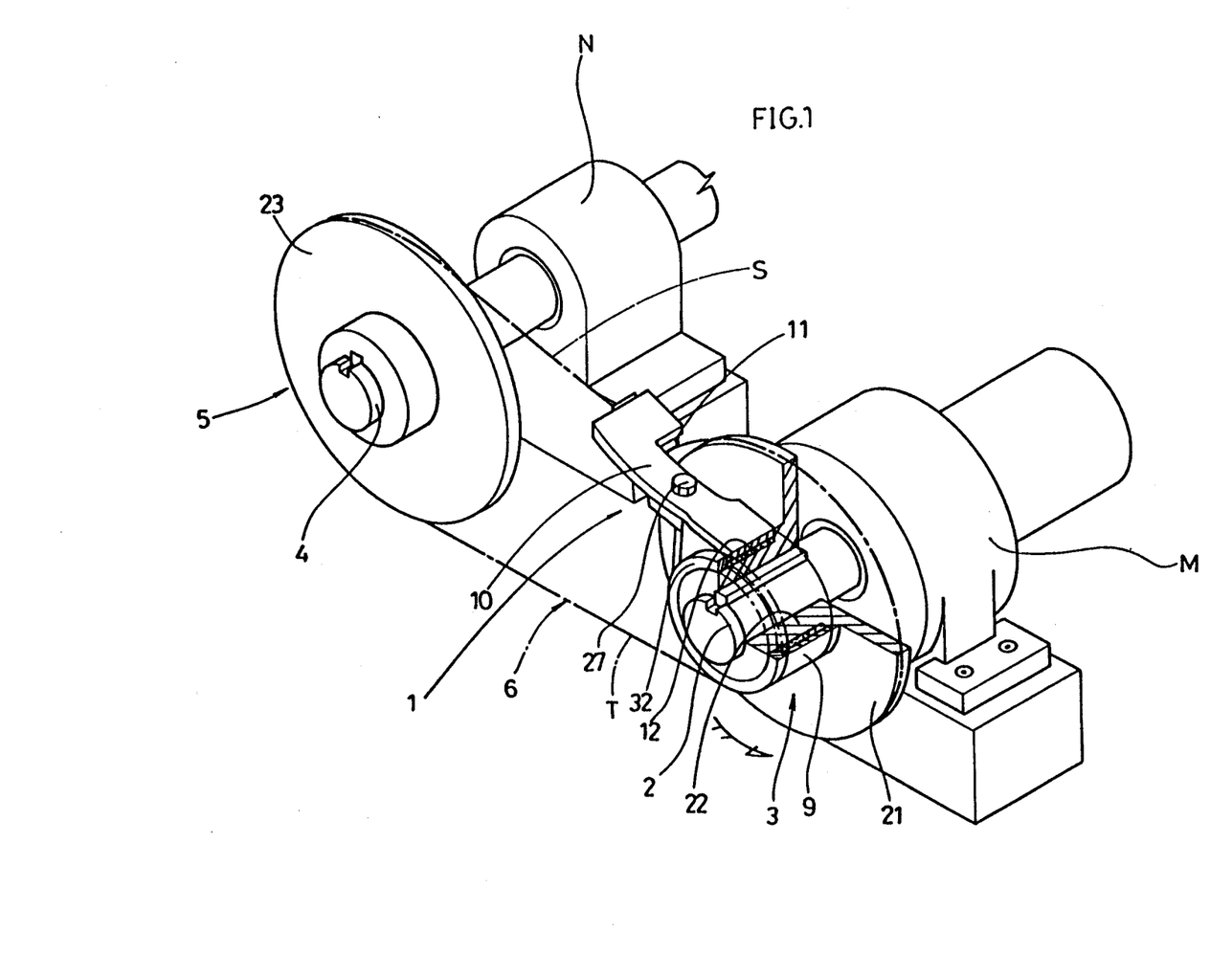
FIG. 1 is a perspective view showing an embodiment of the invention.
Figure 2:
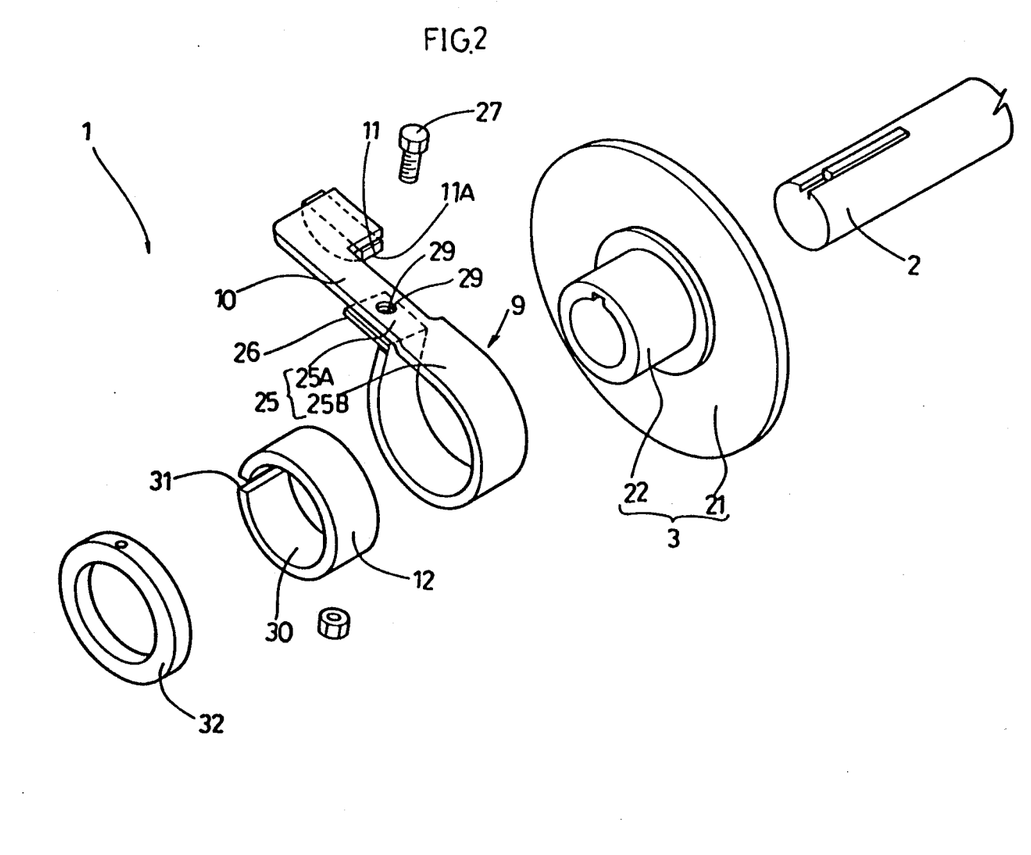
FIG. 2 is an exploded perspective view of its essential parts.
Figure 3:
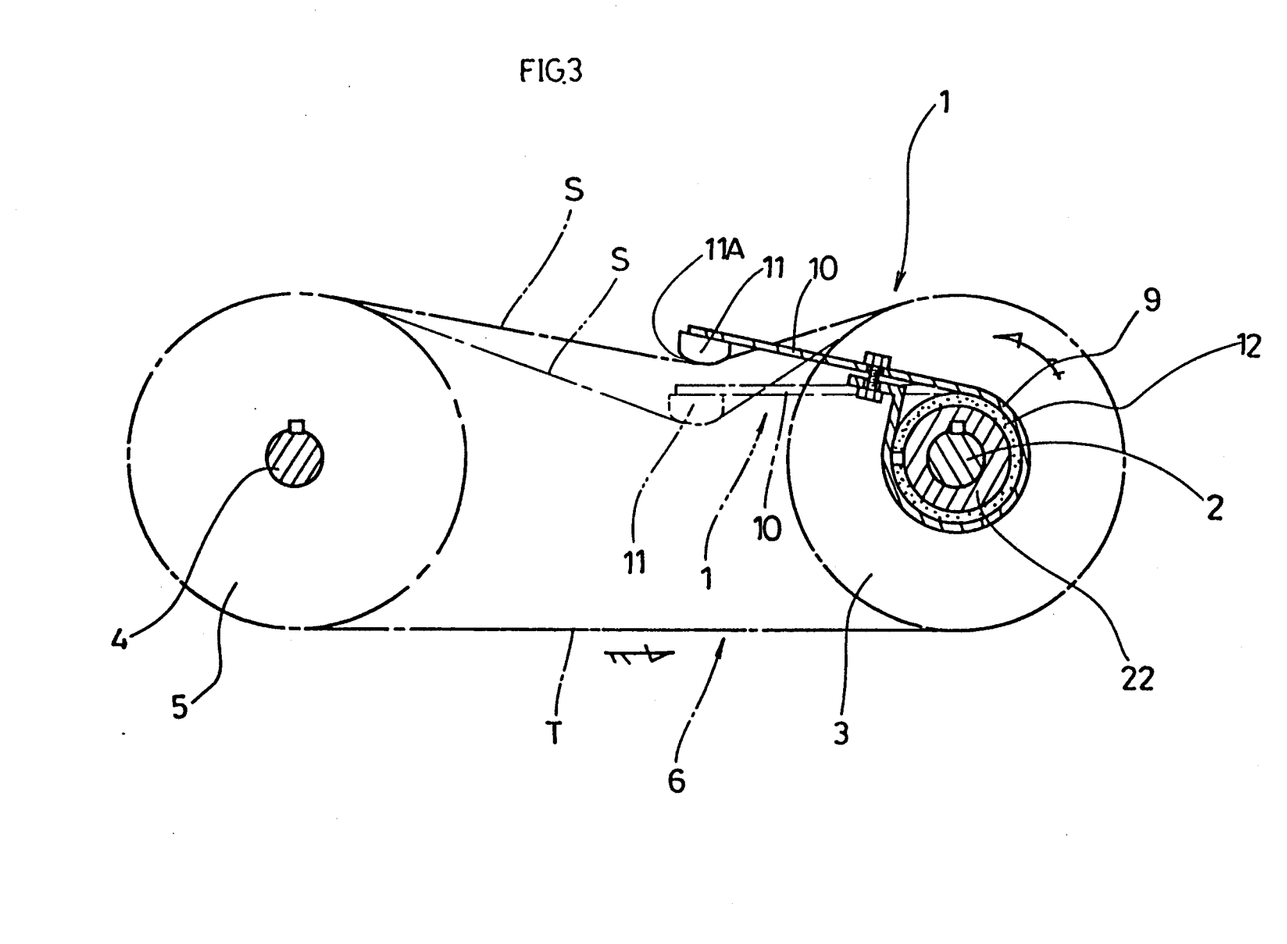
FIG. 3 is a front view showing its action.

In the invention as described in FIGS. 1 to 3, an endless belt 6 is applied on a driving rotating body 3 mounted on a drive shaft 2, and a driven rotating body 5 mounted on a driven shaft 4.

In this embodiment, the endless belt 6 is formed as a known roller chain, and the driving and driven rotating bodies respectively form chain wheels.

The tensioner 1 of the invention is, in this embodiment, composed of a base part 9 attached to the drive shaft 2, an arm part 10 extending from the base part 9, and a contact surface member 11 attached to the arm part 10.

The drive shaft 2 is, in this embodiment, the output shaft of a reduction motor M, and the driven shaft 4 is connected to the driven body which is, not shown herein, disposed parallel to the drive shaft 2 and rotatably pivoted on a bearing N.

The driving rotating body 3 is fitted to the drive shaft 2 with a key or the like, and a wide and cylindrical boss 22 is projecting from a disk-shape base plate 21 on which the endless belt 6 is wound.

The driven rotating body 5 has, same as the driving rotating body 3, a disk-shaped base plate 23 on which the endless belt 6 is wound, and is affixed to the driven shaft 4 with a key or the like.

The endless belt 6 applied on the driving and driven rotating bodies 3, 5, and as the drive shaft 2 rotates, a power traveling line T formed at one side and relaxed traveling line S on the other side, between the driving and driven rotating bodies 3, 5.

In a main body part 25 composed of a straight part 25A and a winding-up part 25B formed by winding up a strip having elasticity such as spring material in the shape of a FIG. 6, the base part 9 projects a bulge 26 extending parallel having a gap between the winding-up end of the winding-up 25B and the straight part 25A. Holes 29, 29 for inserting a bolt 27 are concentrically pierced in the straight part 25A and the bulge 26.

A sliding member 12 is inserted into the opening formed by the winding-up part 25B of the main body 25. The sliding member 12 is a tubular body possessing an internal circumferential surface 30 fitting with the outer circumferential surface of the boss 22 of the driving rotating body 3, and a split groove 31 extending in the axial direction is provided in the tubular wall along the entire width.

The sliding member 12 is made of hard rubber, if the boss 22 is metallic, which can slide on the metal with a frictional force. Instead of hard rubber, it may be also made of a different metal from the boss 22 or a synthetic resin material.

It is also possible to form the main body 25 itself as the sliding member 12.

The base part 9 is connected to the drive shaft 2 through the boss 22 by tightening the bolt 27 penetrating through the two holes 29, 29, and the frictional force may be increased or decreased by adjusting the tightening strength of the bolt 27.

In this embodiment, therefore, the base part 9 has a sliding member 12 which is attached to the drive shaft 2 through the boss 22 with a frictional force.

The base part 9 is, meanwhile, prevented from slipping out by a collar 32 fitted externally to the outer end part of the boss 22.

The arm part 10 is a slender plate projected from the straight part 25A of the base part 9 and extending along the relaxed traveling line S of the endless belt 6, and it is preferred to be made of an elastic material same as the main body 25.

The contact surface member 11 possesses an abutting surface 11A which abuts against the outward surface positioned on the opposite side of the inward surface toward the power traveling line T when the base part 9 is mounted on the drive shaft 2 as in this embodiment, as well as against the relaxed traveling side S of the endless belt 6, and this abutting surface 11A is formed on a convex curvature.

In this way, by mounting the base part 9 on the drive shaft 2, the abutting surface member 11 abuts against the outward surface of the endless belt 6, and by this abutting and pressing, the endless belt 6 is dented toward the power traveling line T as shown in FIG. 3 at the relaxed traveling line S. Therefore, the endless belt 6 increases, by the pressure of the contact surface member 11, in the winding angle on both driving rotating body 3 and driven rotating body 5, and the transmission force between the driving and driven rotating bodies 3, 5 increases, so that the transmission efficiency may be enhanced.

The contact surface member 11 is made of hard rubber or synthetic resin material if the endless belt 6 is made of steel such as chain. Or when the endless belt 6 is made of rubber or synthetic resin material such as belt, nonferrous metal, Teflon and other material having smooth sliding performance on the endless belt 6 is properly selected and used.

Incidentally, the contact surface member 11 may be also formed as a roller pivoted on a pin projected from the side of the arm 10.

The contact surface member 11 obtains the pressing force on the endless belt 6 by the frictional force produced against the drive shaft, and in order to decrease the required frictional force and suppress the heat generation from the sliding member 12, it is desired to install the contact surface member 11 at a position close to the driving rotating body 3.

Figure 4:
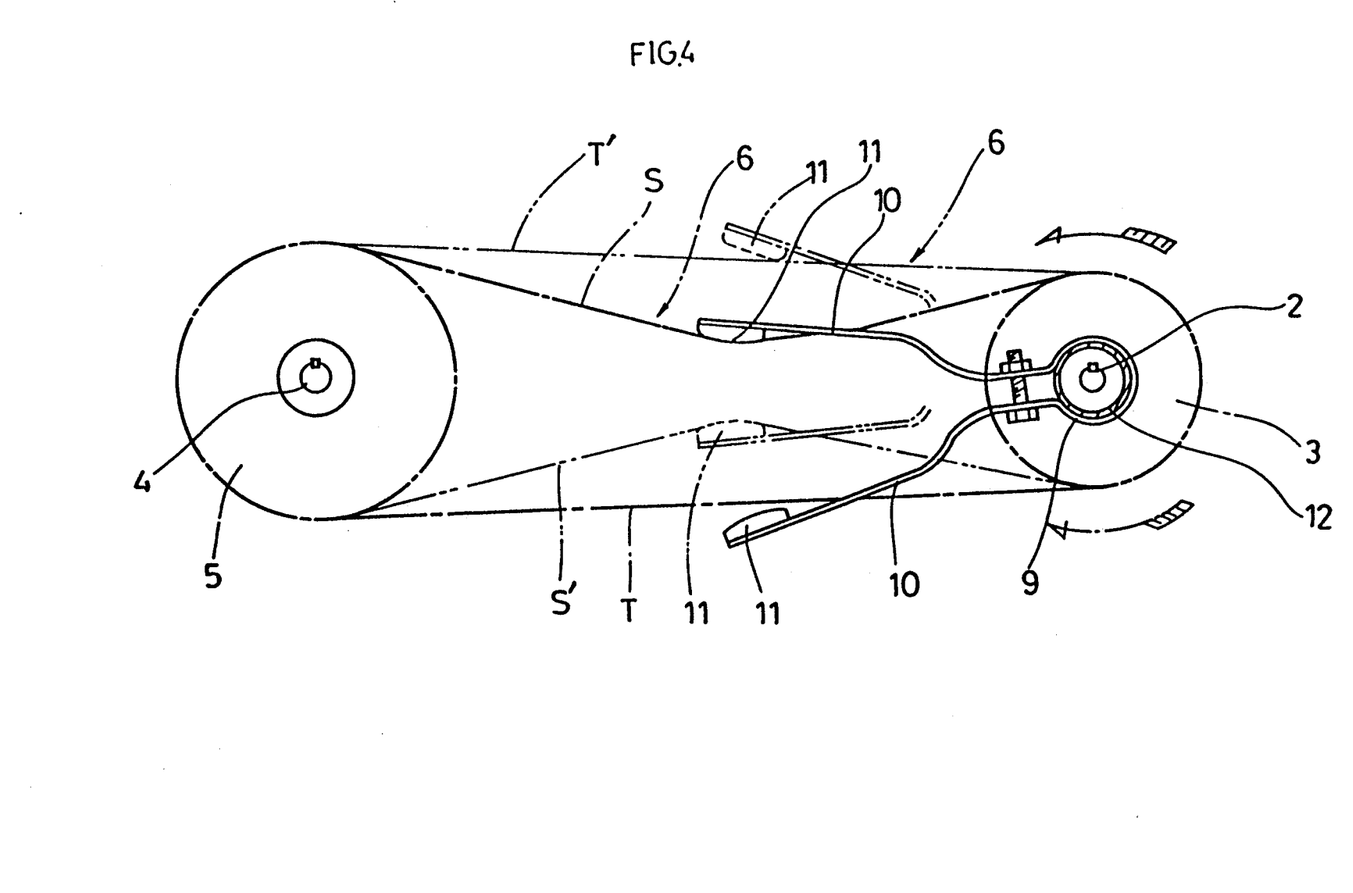
FIG. 4 is a front view showing an other embodiment.

FIG. 4 shows other embodiment of the tensioner 1 in which the drive shaft 2 rotates both normally and in reverse.

In this example, as the drive shaft rotates normally and in reverse, the relaxed traveling line S and the power traveling line T are alternatively repeated.

The tensioner 1 has two arms 10, 10 extending respectively along two relaxed traveling lines S, S' from the base part 9 attached to the drive shaft 2, and contact surface members 11, 11 abutting against the outward surfaces of the relaxed traveling lines S, S' are attached to the arms 10, 10.

Therefore, when the drive shaft 2 rotates in the normal direction, the two arms 10, 10 turn in the same rotating direction, and the contact surface member 11 attached to one arm part 10 abuts against the relaxed traveling line S side to reduce its slack. At the same time, the contact surface member 11 attached to the other arm part 10 is freed from the endless belt 6.

When rotating in reverse, the contact surface member 11 attached to the other arm part 10 abuts against the relaxed traveling line S' so that its slack is reduced.

Thus, whether the drive shaft 2 rotates normally or in reverse, by extending two arm parts 10 to which the contact surface member 11 is attached from the single base part 9 attached to the drive shaft 2, the slack caused alternatively in the relaxed traveling lines S, S' may be reduced, and any adjustment for positioning the contact surface member 11 is not necessary.

Furthermore, if the drive shaft 2 moves toward or away from the driven shaft 4 to always vary the distance between the drive shaft 2 and driven shaft 4 as shown in FIG. 5, by applying the tensioner 1 of the invention, the slack may be always reduced, corresponding to the fluctuations of the drive shaft 2 without having the adjust the position of the contact surface member 11.

FIG. 6 shows another embodiment of mounting the base part 9 on the driven shaft 4. In this example, the contact surface member 11 abuts against the inner surface of the endless belt 6 at the relaxed traveling line S, thereby pressing the relaxed traveling line S outward in the peripheral direction.

Therefore, even if the relaxed traveling line S and the power traveling line T are close to each other, the relaxed and power traveling lines S, T do not contact with each other by the pressing force of the contact surface member 11, so that the power may be transmitted securely.

Moreover, if the endless belt is formed by a roller chain and the thickness varies due to the uneven parts in the link plates, by the frictional force and slipping of the base part caused by the rotation of the drive shaft, the contact surface member can follow up the outward surface of the endless belt, and the slack may be removed stably without causing vibrations on the endless belt and contact surface member.

In this invention, meanwhile, the slipping member may be also directly mounted on the drive shaft or the outer circumferential surface of the driven shaft, and the invention may be modified in various ways.

As described herein, the tensioner of the invention having such construction as described herein is capable of saving the maintenance and adjustment jobs notably because the contact surface member can press an endless belt by a frictional force caused between the base part and the drive shaft or driven shaft and therefore it is not necessary to adjust the position of the contact surface member for removing the slack of the contact surface member.

Besides, since the base part is mounted on the drive shaft or driven shaft, the base for supporting the contact surface member is not necessary, and the cost may be reduced easily, and even if there is fluctuation in the distance between the drive shaft and driven shaft, the contact surface member may abut against the endless belt by following up the movement of the endless belt, so that the scope of application may be extended.

In addition, since the slack caused on the endless belt is reduced at the relaxed traveling line side, and hence the endless belt at the power traveling line side of the endless belt is not pressed, so that smooth transmission is realized without causing vibrations on the endless belt or tensioner when transmitting or when starting up.

What is claimed is:

1. A tensioner for reducing the slack of a relaxed traveling line of an endless belt for forming a power traveling line to transmit power as being applied on a driving rotating body mounted on a drive shaft and a driven rotating body mounted on a driven shaft and a return side relaxed traveling line between the rotating bodies, consisting of a base part mounted on the drive shaft or the driven shaft and receiving the rotational moment acting in the same direction as the rotation of said shaft;

an unitary arm part extending from the base part toward the relaxed traveling line of the endless belt, and a contact member affixed to the arm part, abutting against the relaxed traveling line of the endless belt and pushing said relaxed traveling line by said moment so as to reduce the slack thereof;

said base part having a sliding member which generates said moment by press contacting against said shaft with a frictional force.

2. A tensioner according to claim 1, wherein said sliding member is a cylindrical body on said shaft, and a portion of said base body is circumferentially around the tubular sliding member and clamping down the cylindrical sliding member to said shaft so as to produce said frictional force.

* * * * *